United States Patent
Liu et al.

(10) Patent No.: US 10,310,894 B2
(45) Date of Patent: Jun. 4, 2019

(54) METHOD AND DEVICE FOR GENERATING CONFIGURATION INFORMATION OF DYNAMIC RECONFIGURABLE PROCESSOR

(71) Applicant: Tsinghua University, Beijing (CN)

(72) Inventors: Leibo Liu, Beijing (CN); Yansheng Wang, Beijing (CN); Guiqiang Peng, Beijing (CN); Zhaoshi Li, Beijing (CN); Shouyi Yin, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 327 days.

(21) Appl. No.: 15/119,114

(22) PCT Filed: Jun. 16, 2014

(86) PCT No.: PCT/CN2014/079991
§ 371 (c)(1),
(2) Date: Aug. 15, 2016

(87) PCT Pub. No.: WO2015/149433
PCT Pub. Date: Oct. 8, 2015

(65) Prior Publication Data
US 2017/0052818 A1    Feb. 23, 2017

(30) Foreign Application Priority Data
Mar. 31, 2014    (CN) .......................... 2014 1 0126188

(51) Int. Cl.
*G06F 9/48* (2006.01)
*G06F 15/78* (2006.01)
(Continued)

(52) U.S. Cl.
CPC ........ *G06F 9/4881* (2013.01); *G06F 15/7871* (2013.01)

(58) Field of Classification Search
None
See application file for complete search history.

(56) References Cited

U.S. PATENT DOCUMENTS

2010/0211747 A1    8/2010    Shim
2012/0054468 A1*   3/2012    Egger ................... G06F 9/3877
                                                                  712/20

FOREIGN PATENT DOCUMENTS

CN         102298568 A      11/2011
CN         102279753 A      12/2011
(Continued)

OTHER PUBLICATIONS

China Patent Office, Office action dated Mar. 30, 2016 for CN application 201410126188.4, which is a China counterpart application of the present US patent application.
(Continued)

*Primary Examiner* — Eric C Wai
(74) *Attorney, Agent, or Firm* — Houtteman Law LLC

(57) ABSTRACT

Provided is a method for generating configuration information of a dynamic reconfigurable processor. The dynamic reconfigurable processor includes a processing unit array, and the processing unit array includes a plurality of processing units. The method includes steps of: reading information of a task to be executed and generating an array configuration information top of the processing unit array according to the information; generating a plurality of processing unit configuration information corresponding to the plurality of processing units respectively according to the information; and assembling the array configuration information top and the plurality of processing unit configuration information.

11 Claims, 6 Drawing Sheets

(51) Int. Cl.
G06F 9/46    (2006.01)
G06F 15/00   (2006.01)
G06F 15/76   (2006.01)

(56) References Cited

FOREIGN PATENT DOCUMENTS

CN    102567279 A    7/2012
CN    102411555 B    1/2014

OTHER PUBLICATIONS

China Patent Office, Office action dated Dec. 1, 2016 for CN application 201410126188.4, which is a China counterpart application of the present US patent application.
China Patent Office, Notification to Grant Patent Rights for Invention dated Mar. 28, 2017 for CN application 201410126188.4, which is a China counterpart application of the present US patent application.

* cited by examiner

METHOD AND DEVICE FOR GENERATING CONFIGURATION INFORMATION OF DYNAMIC RECONFIGURABLE PROCESSOR

CROSS-REFERENCE TO RELATED APPLICATION

This application claims priority to and benefits of Chinese Patent Application No. 201410126188.4, filed with the State Intellectual Property Office of P. R. China on Mar. 31, 2014, the entire content of which is incorporated herein by reference.

FIELD

The present disclosure relates to a processor field, and more particularly to a method for generating configuration information of a dynamic reconfigurable processor, a device for generating configuration information of a dynamic reconfigurable processor, and processor configuration device.

BACKGROUND

Dynamic reconfigurable processor is a new processor which is advantageous over conventional single-core processors, dedicated chips and field programmable logic arrays, and is a future direction for developing circuit structures.

Firstly, the dynamic reconfigurable processor often contains a plurality of arithmetic logic units in large quantities which are also called many-core array. The many-core array has a routing unit with high flexibility in the interior thereof, so as to realize diversified interconnections between the arithmetic logic units. Therefore, the many-core array connected by the routing unit can process data with a high speed, which is advantageous over the traditional single core and less-core processors in performance. Meanwhile, the multi-core array is also advantageous over the cured dedicated circuits in flexibility.

The previous static reconfigurable circuit only programs circuit function before the operation of the circuit and initializes the circuit, without changing the circuit function. Compared to the traditional static reconfigurable circuit (such as field programmable logic array), the dynamic reconfigurable processor has dynamic characteristics, i.e. being capable of dynamically switching circuit functions during the operation of the circuit. In this way, the circuit scale is reduced, because the circuit structure has changed from full mapping to block mapping, and dynamic switching may be performed between the blocks.

However, dynamic switching design of the current dynamic reconfigurable processor has at least the following problems:

1) a large quantity of configuration information resulting in increases of the configuration time and capacity of the configuration memory;

2) an increase of the configuration power due to the frequent switching configuration information in the dynamic reconfigurable processor;

3) being not capable of switching configuration of one processing unit without keeping other processing units in original configurations. In other words, during the configuration of the reconfigurable processor array, as long as the function of one processing unit is changed, the entire array is required to be reconfigured. That is to say, a large quantity of blind configurations need to be performed.

SUMMARY

Embodiments of the present disclosure seek to solve at least one of the problems existing in the related art to at least some extent.

A first objective of the present disclosure is to provide a method for generating configuration information of a dynamic reconfigurable processor. With the method for generating configuration information of a dynamic reconfigurable processor according to embodiments of the present disclosure, only processing units required to switch configuration are configured, while configurations of other processing units remain unchanged, thus avoiding repeat configuration of the processing unit. In addition, both partial configuration and selective configuration may be realized, and the flexibility of configuration is improved.

A second objective of the present disclosure is to provide a device for generating configuration information of a dynamic reconfigurable processor.

A third objective of the present disclosure is to provide a processor configuration device.

A fourth objective of the present disclosure is to provide a readable storage medium.

According to a first aspect of embodiments of the present disclosure, a method for generating configuration information of a dynamic reconfigurable processor is provided. The dynamic reconfigurable processor includes a processing unit array including a plurality of processing units. The method for generating configuration information of a dynamic reconfigurable processor includes steps of: reading information of a task to be executed and generating an array configuration information top of the processing unit array according to the information; generating a plurality of processing unit configuration information corresponding to the plurality of processing units respectively according to the information; and assembling the array configuration information top and the plurality of processing unit configuration information.

With the method for generating the configuration information of the dynamic reconfigurable processor according to an embodiment of the present disclosure, the information of the task to be executed may be read, the array configuration information top and the plurality of processing unit configuration information corresponding to the plurality of processing units respectively may be generated according to the information, and the array configuration information top and the plurality of processing unit configuration information may be assembled to generate the configuration information of the dynamic reconfigurable processor. The method for generating the configuration information of the dynamic reconfigurable processor according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, a partial configuration and a selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

According to a second aspect of embodiments of the present disclosure, a device for generating configuration information of a dynamic reconfigurable processor is provided. The dynamic reconfigurable processor includes a processing unit array including a plurality of processing units. The device for generating configuration information of a dynamic reconfigurable processor includes: a storage module of a task to be executed, configured to store information of the task to be executed; a reading module, configured to read the information; a first generating module, configured to generate array configuration information top of the processing unit array according to the information; a second generating module, configured to generate a plurality of processing unit configuration information corresponding to the plurality of processing units respectively according to the information; and an assembly module, configured to assemble the array configuration information top and the plurality of processing unit configuration information to generate the configuration information of the dynamic reconfigurable processor.

With the device for generating the configuration information of the dynamic reconfigurable processor according to an embodiment of the present disclosure, the array configuration information top may be generated by the first generating module according to the information; the processing unit configuration information corresponding to the processing units respectively may be generated by the second generating module according to the information; and the configuration information of the dynamic reconfigurable processor may be generated by assembling the array configuration information top and the plurality of processing unit configuration information via the assembly module. The device for generating the configuration information of the dynamic reconfigurable processor according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, both partial configuration and selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

According to a third aspect of embodiments of the present disclosure, processor configuration device is provided. The processor configuration device according to embodiments of the present disclosure includes: a first configuration module, configured to read array configuration information top of configuration information, and to distribute a computational granularity and a number of loop iteration of the array configuration information top to a processing unit array; a second configuration module, configured to read a plurality of processing unit configuration information in the configuration information, and to distribute the plurality of processing unit configuration information to corresponding processing units respectively, in which the processing unit configuration information includes processing unit configuration information top and a plurality of operator configuration information; and a configuration controlling module, configured to control the first configuration module to read the array configuration information top according to operating parameters, and to control the second configuration module to read the plurality of processing unit configuration information according to the operating parameters.

With the processor configuration device according to an embodiment of the present disclosure, the array configuration information top of configuration information may be read and the computational granularity as well as the number of loop iteration of the array configuration information top may be distributed to the processing unit array by the first configuration module; the plurality of processing unit configuration information in the configuration information may be read and the plurality of processing unit configuration information may be distributed to corresponding processing units respectively by the second configuration module; and the first configuration module is controlled to read the array configuration information top according to operating parameters, and the second configuration module is controlled to read the plurality of processing unit configuration information according to the operating parameters by the configuration controlling module. The processor configuration device according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, a partial configuration and a selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

According to a fourth aspect of the present disclosure, a computer readable storage medium is provided. The computer readable storage medium includes a computer program for executing the method for generating configuration information of a dynamic reconfigurable processor according to the first aspect of the present disclosure when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
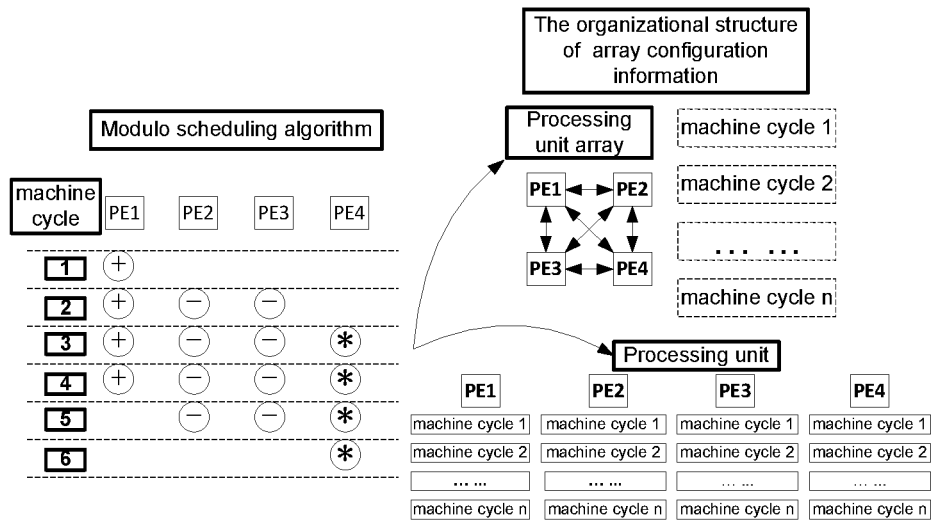
FIG. 1 is a schematic view of the two configuration information structure based on modulo scheduling algorithm.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, terms such as "first" and "second" are used herein for purposes of description and are not intended to indicate or imply relative importance or significance. In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, in the description of the present disclosure, "a plurality of" means two or more than two features, unless specified otherwise.

Currently, based on modulo scheduling algorithm, configuration information of a processing unit array in a dynamic reconfigurable processor should represent information covered by modulo scheduling algorithm results. As shown in FIG. 1 (left part), how to map modulo scheduling algorithm into four processing units (PE 1, PE 2, PE 3 and PE 4) is illustrated. In a traverse view, the results of modulo scheduling algorithm include a series of operations of the processing unit array during each machine cycle. The structure of the configuration information of the dynamic reconfigurable processor is shown in FIG. 1 (upper right part), in which operations of the processing unit array during each machine cycle is described, using the processing unit array as unit.

As shown in FIG. 1 (the left part), in a longitudinal view, the results of modulo scheduling algorithm can be understood as operations of the processing unit in the processing unit array during each machine cycle. As shown in FIG. 1 (the lower right part), the structure of another configuration information of dynamic reconfigurable processor is described, in which operations of each processing unit during each machine cycle is described, using the processing unit as unit.

These two kinds of configuration information are logically equivalent. One kind of these configuration information is described from the point of the entire processing unit array, while the other kind is described from the point of the bottom processing unit. As shown in FIG. 1 (the left part), a single processing unit may execute the same operation in continuous machine cycles during the running process (such as running loop body), which provides a feasibility for compressing the configuration information.

Embodiments of the present disclosure provide a method for generating configuration information of a dynamic reconfigurable processor, a device for generating configuration information of a dynamic reconfigurable processor, and processor configuration device. In the following, the method for generating configuration information of a dynamic reconfigurable processor, the device for generating configuration information of a dynamic reconfigurable processor, and the processor configuration device according to embodiments of the present disclosure will be described in detail with reference to the drawings.

Figure 2:
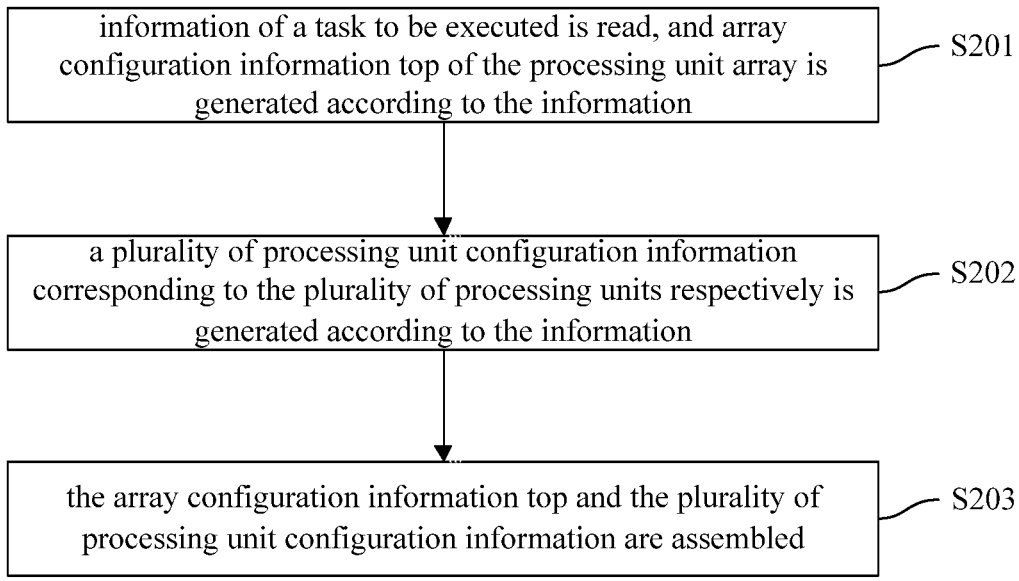
FIG. 2 is a flow chart of a method for generating configuration information of a dynamic reconfigurable processor according to an embodiment of the present disclosure.

FIG. 2 is a flow chart of a method for generating configuration information of a dynamic reconfigurable processor according to an embodiment of the present disclosure.

It should be noted that, in some embodiments of the present disclosure, the dynamic reconfigurable processor may include a processing unit array, and the processing unit array may include a plurality of processing units. As shown in FIG. 2, the method for generating configuration information of a dynamic reconfigurable processor according to embodiments of the present disclosure may include the following steps S201-203.

In the step S201, information of a task to be executed is read, and array configuration information top of the processing unit array is generated according to the information.

Specifically, in some embodiments, firstly the information of a task to be executed is read, and then a computational granularity and a number of loop iteration of the task to be executed is extracted from the information of a task to be executed, so as to generate the array configuration information top. In some embodiments of the present disclosure, the array configuration information top may include the computational granularity and the number of loop iteration, the computational granularity may be corresponding to a computational granularity of an ALU (Arithmetic Logic Unit) of the processing unit, and the number of loop iteration can be iterations of a loop body (i.e., the task to be executed) when the processing unit array is processing a cycle. It should be noted that, in some embodiments of the present disclosure, when the task to be executed is not a recycling task, the number of loop iteration extracted from the information of a task to be executed may be 0, i.e. the iterations of the loop body is 1. In this specific embodiment, no iteration is performed.

S202, a plurality of processing unit configuration information corresponding to the plurality of processing units respectively is generated according to the information.

It should be noted that, in some embodiments of the present disclosure, in view of the plurality of processing units, methods for generating processing unit configuration information of the processing units are the same.

Specifically, in some embodiments of the present disclosure, an execution instruction mapped into one of the plurality of processing units is determined according to the information of the task to be executed, and the processing unit configuration information corresponding to the one processing unit is generated according to the execution instruction. In an embodiment of the present disclosure, the processing unit configuration information may include processing unit configuration information top and a plurality of operator configuration information. In an embodiment of the present disclosure, the processing unit configuration information top may include an initial machine cycle number, an operator number and a configuration change option.

It should be noted that, in some embodiments of the present disclosure, the initial machine cycle may indicate in which the machine cycle the processing unit starts to calculate. The operator number may be a number of the operator configuration information contained in the processing unit configuration information. The configuration change option may include an option to change interconnected configuration information and an option to change configuration information of ALU operation code when the configuration information of the processing unit changes.

It should be understood that, in one embodiment of the present disclosure, a number of the operator configuration information may be the same as the operator number, and each operator may have corresponding operator configuration information. In some embodiments of the present disclosure, each of the operator configuration information may include an input, an ALU operation code, a continuous operation cycle number, an interval cycle number, a memory write access, etc.

It should be noted that, in some embodiments of the present disclosure, the input may be used to indicate an input from the Router (array of interconnected), memory read access and its address. The ALU operation code may include various ALU operations in the reconfigurable processing unit. The continuous operation cycle number may refer to a number of machine cycles continuously operated by the current operator configuration information. The interval cycle number may refer to a number of unworking machine cycles between two adjacent operators. The memory write access may indicate whether write access is allowed by the memory, and a memory write address.

It should be noted that, in some embodiments of the present disclosure, the adjacent and same computions in a series of sequential computions mapped into the current processing unit by using the continuous operation cycle number may be expressed via one operator configuration information, thus the amount of the configuration information to be dynamically switched may be reduced.

S203, the array configuration information top and the plurality of processing unit configuration information are assembled.

Specifically, in some embodiments of the present disclosure, the array configuration information top and the plurality of processing unit configuration information are assembled in a preset order to generate the configuration information of the dynamic reconfigurable processor. It should be understood that, each array configuration information top is corresponding to a plurality of processing unit configuration information, and the assembled configuration information needs to be compressed.

With the method for generating the configuration information of the dynamic reconfigurable processor according to an embodiment of the present disclosure, the information of the task to be executed may be read, the array configuration information top and the plurality of processing unit configuration information corresponding to the plurality of processing units respectively may be generated according to the information, and the array configuration information top and the plurality of processing unit configuration information may be assembled to generate the configuration information of the dynamic reconfigurable processor. The method for generating the configuration information of the dynamic reconfigurable processor according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, a partial configuration and a selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

In the following, a method for generating the configuration information of the dynamic reconfigurable processor according to embodiments of the present disclosure is described.

Figure 3:
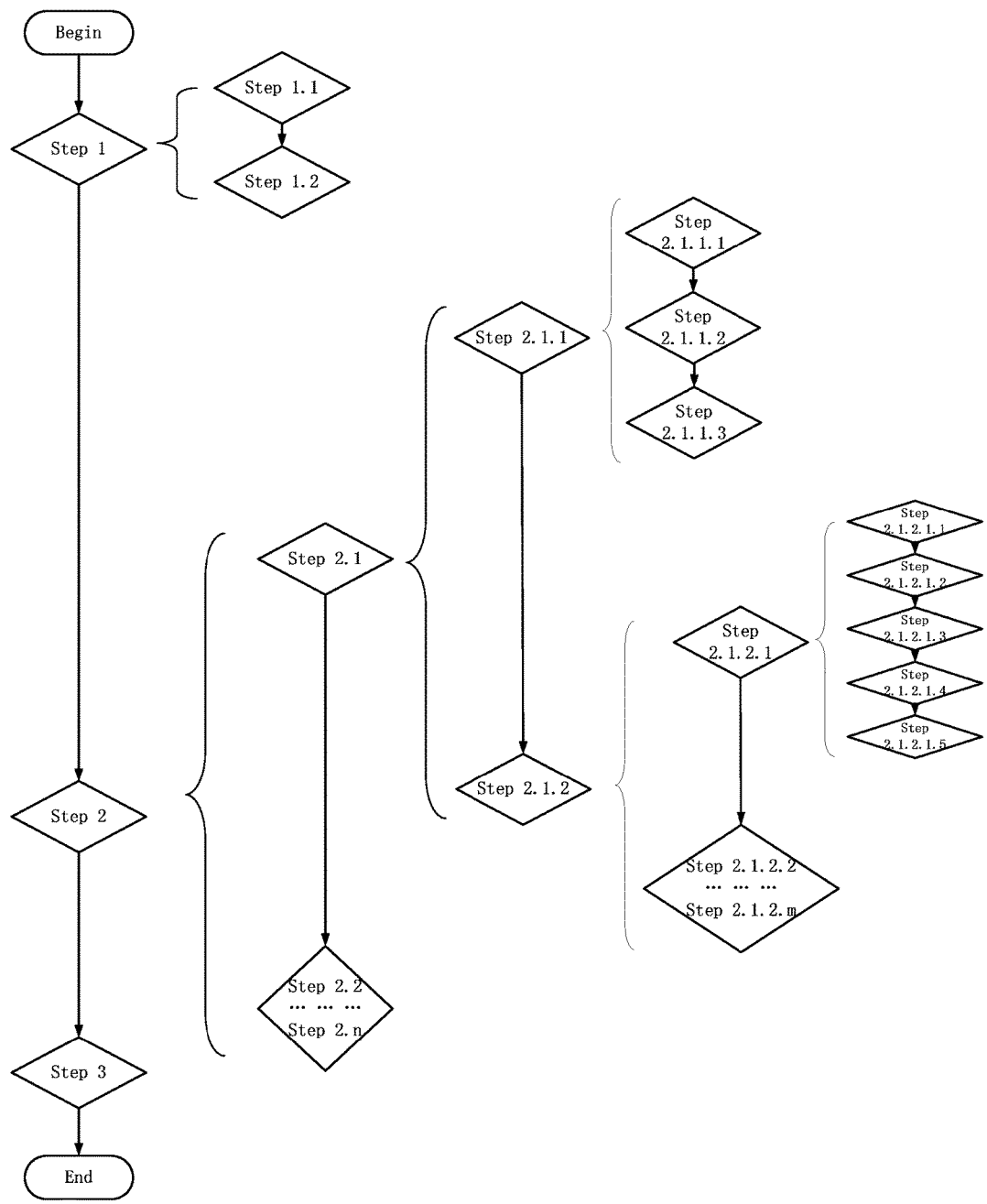
FIG. 3 is a flow chart of a method for generating configuration information of a dynamic reconfigurable processor according to another embodiment of the present disclosure.

For example, as shown in FIG. 3, the method for generating the configuration information of the dynamic reconfigurable processor according to embodiments of the present disclosure includes steps 1-3). In the step 1), the information of a task to be executed is read, and then the array configuration information top of the processing unit array is generated according to the information. In some embodiments, the step 1) may include steps 1.1) and Step 1.2). In the step 1.1), the computational granularity is generated, and the number of loop iteration is generated. Subsequently, in the step 2), the plurality of processing unit configuration information corresponding to the plurality of processing units is generated according to the information of a task to be executed. The number of processing unit configuration information is corresponding to the number of processing units in the array, assuming that the number is n. The step 2) may include steps 2.1) and 2.2). In the step 2.1), the first processing unit processing unit configuration information corresponding to the first processing unit is generated. In the step 2.1), the processing unit configuration information top of the processing unit array is generated (step 2.1.1), and the plurality of operator configuration information of the processing unit is generated (step 2.1.2).

In some embodiments, the step 2.1.1) may include steps 2.1.1.1)-2.1.1.3): the initial machine cycle number is generated (step 2.1.1.1), the operator number is generated (step 2.1.1.2), and the configuration change option is generated (step 2.1.1.3). The step 2.1.2) may include steps 2.1.2.1)-2.1.2.5): the input information is generated (step 2.1.2.1), the ALU operation code is generated (step 2.1.2.1.2), the continuous operation cycle number is generated (step 2.1.2.1.3), the interval cycle number is generated (step 2.1.2.1.4), and the memory write access is generated (step 2.1.2.1.5).

As shown in FIG. 3, the step 2.1.2) may include steps 2.1.2.1)-2.1.2.m): the remaining operator configuration information of the processing unit is generated, in which m is the number of the operator configuration information, reference of which is made to the step 2.1.2.1.

In some embodiments, the step 2) may include steps 2.2-2.n): the remaining processing unit configuration information of the processing units is generated, in which n is the number of processing units, reference of which is made to the step 2.1.

Finally, in the step 3), the array configuration information top and all the processing unit configuration information are assembled to generate the configuration information of the dynamic reconfigurable processor.

Further, embodiments of the present disclosure embodiment also provide a device for generating configuration information of a dynamic reconfigurable processor.

Figure 4:
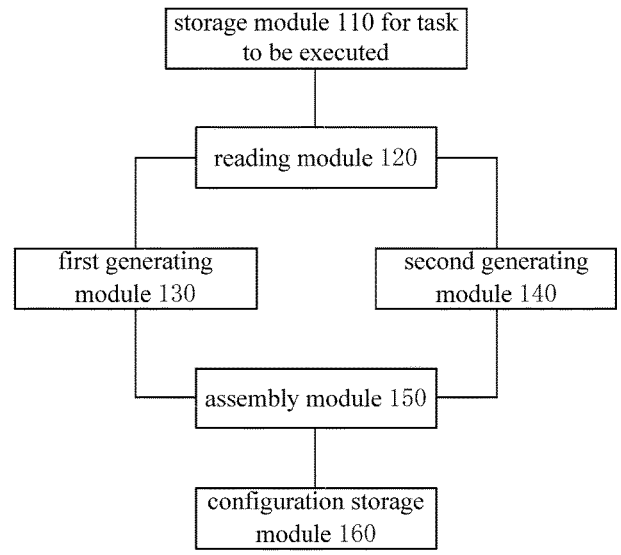
FIG. 4 is a schematic diagram of a device for generating configuration information of a dynamic reconfigurable processor according to an embodiment of the present disclosure.

FIG. 4 is a schematic diagram of a device for generating configuration information of a dynamic reconfigurable processor according to an embodiment of the present disclosure.

It should be noted that, in some embodiments of the present disclosure, the dynamic reconfigurable processor may include a processing unit array; the processing unit array may include a plurality of processing units. Specifically, as shown in FIG. 4, the device for generating configuration information of a dynamic reconfigurable processor include a storage module 110 of task to be executed, a reading module 120, a first generating module 130, a second generating module 140 and an assembly module 150.

Specifically, in some embodiments, the storage module 110 is configured to storage information of a task to be executed. In one embodiment of the present disclosure, the task to be executed is a task processed by the modulo scheduling algorithm, i.e. compiled macro instruction.

In some embodiments, the reading module 120 is configured to read the information of a task to be executed. The first generating module 130 is configured to generate array configuration information top of the processing unit array according to the information.

Specifically, in some embodiments, the first generating module 130 is configured to extract a computational granularity and a number of loop iteration of the task to be executed from the information. In some embodiments, the computational granularity and the number of loop iteration may form the array configuration information top. The computational granularity may be corresponding to a computational granularity of an ALU (Arithmetic Logic Unit) of the processing unit, and the number of loop iteration can be iterations of a loop body (i.e., the task to be executed) when the processing unit array is processing a cycle. It should be noted that, in some embodiments of the present disclosure, when the task to be executed is not a recycling task, the number of loop iteration extracted from the information of a task to be executed may be 0, i.e. the iterations of the loop body is 1. In this specific embodiment, no iteration is performed.

The second generating module 140 is configured to generate a plurality of processing unit configuration information corresponding to the plurality of processing units respectively according to the information. It should be noted that, in some embodiments of the present disclosure, in view of the plurality of processing units, methods for generating processing unit configuration information of the processing units are the same.

Specifically, the second generating module 140 is configured to determine an execution instruction mapped into one of the plurality of processing units according to the information, and to generate the processing unit configuration information corresponding to the one processing unit according to the execution instruction. In an embodiment of the present disclosure, the processing unit configuration information may include processing unit configuration information top and a plurality of operator configuration information. In an embodiment of the present disclosure, the processing unit configuration information top may include an initial machine cycle number, an operator number and a configuration change option.

It should be noted that, in some embodiments of the present disclosure, the initial machine cycle may indicate in which the machine cycle the processing unit starts to calculate. The operator number may be a number of the operator configuration information contained in each processing unit configuration information. The configuration change option may include an option to change interconnected configuration information and an option to change configuration information of ALU operation code when the configuration information of the processing unit changes.

It should be understood that, in one embodiment of the present disclosure, a number of the operator configuration information may be the same as the operator number, and each operator may have corresponding operator configuration information. In some embodiments of the present disclosure, each of the operator configuration information may include an input, an ALU operation code, a continuous operation cycle number, an interval cycle number, a memory write access, etc.

It should be noted that, in some embodiments of the present disclosure, the input may be used to indicate an input from the Router (array of interconnected), memory read access and its address. The ALU operation code may include various ALU operations in the reconfigurable processing unit. The continuous operation cycle number may refer to a number of machine cycles continuously operated by the current operator configuration information. The interval cycle number may refer to a number of unworking machine cycles between two adjacent operators. The memory write access may indicate whether write access is allowed by the memory, and a memory write address.

It should be noted that, in some embodiments of the present disclosure, the adjacent and same computations in a series of sequential computations mapped into the current processing unit by using the continuous operation cycle number may be expressed via one operator configuration information, thus the amount of the configuration information to be dynamically switched may be reduced.

The assembly module 150 is configured to assemble the array configuration information top and the plurality of processing unit configuration information to generate the configuration information of the dynamic reconfigurable processor. Specifically, the assembly module 150 is configured to assemble the array configuration information top and the plurality of processing unit configuration information in a preset order to generate the configuration information of the dynamic reconfigurable processor. It should be understood that, each the each array configuration information top is corresponding to a plurality of processing unit configuration information, and the assembled configuration information must be subjected to a data compressing.

Further, in one embodiment of the present disclosure, as shown in FIG. 4, the device further includes a configuration storage module 160. The configuration storage module 160 is configured to store the configuration information generated by the assembly module 150.

Figure 5:
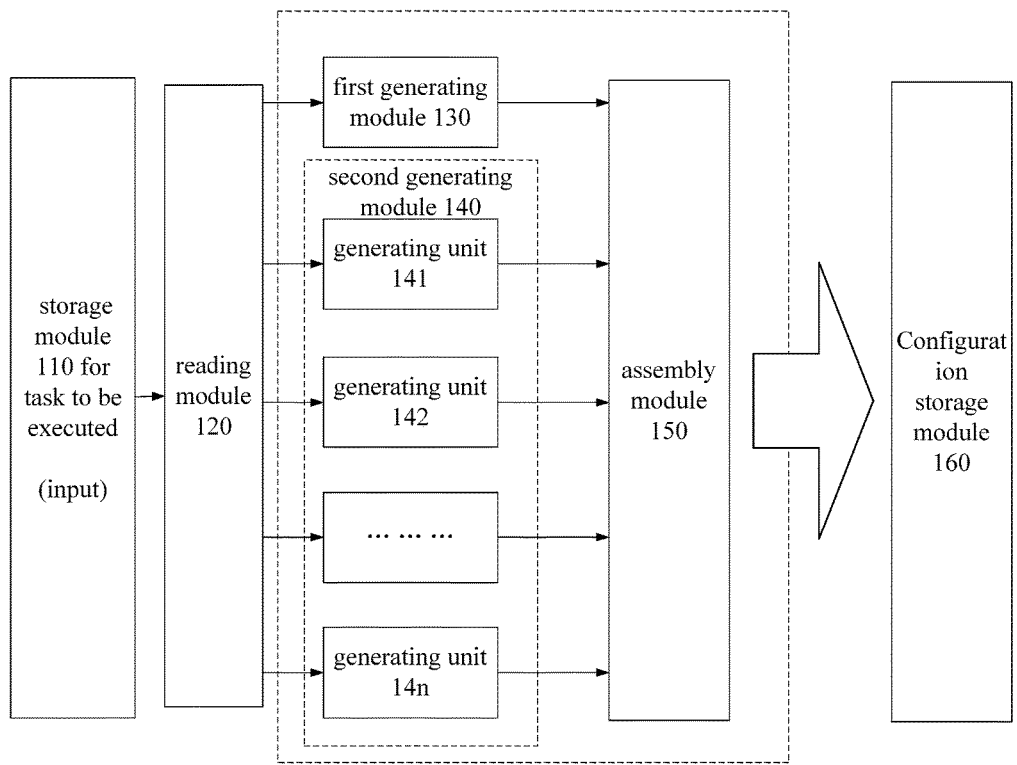
FIG. 5 is a schematic diagram of a device for generating configuration information of a dynamic reconfigurable processor according to an embodiment of the present disclosure.

FIG. 5 is a diagram of a device for generating configuration information of a dynamic reconfigurable processor according to an embodiment of the present disclosure. For example, as shown in FIG. 5, the array configuration information top of the processing unit array is generated by the first generating module 130 according to the information of a task to be executed stored in the storage module 110, in which the storage module 110 may consist of read-only memory ROM.

As shown in FIG. 5, the second generating module 140 may include a plurality of second generating units 141, 142, . . . , 14n, having the same functions, where n is corresponding to the number of processing units. In an embodiment, the information of a task to be executed stored in the storage module 110 is read by the reading module 120, and an execution instruction mapped into the first processing unit is determined by the generating unit 141 according to the information of a task to be executed, and the processing unit configuration information of the first processing unit is generated by the generating unit 141 according to the execution instruction.

As shown in FIG. 5, the plurality of generating units 142 to 142 have the same structure with the generating unit 141, and are configured to generate corresponding processing unit configuration information for the remaining (n−1) processing units simultaneously. The assembly module 150 is configured to assemble the array configuration information top generated by the first generating module 130 and the corresponding processing unit configuration information generated by the plurality of generating units 141 to 14n. Each array configuration information top is corresponding to N processing unit configuration information. The configuration storage module 160 is configured to storage the configuration information generated by the assembly module 150.

With the device for generating the configuration information of the dynamic reconfigurable processor according to an embodiment of the present disclosure, the array configuration information top may be generated by the first generating module according to the information; the processing unit configuration information corresponding to the processing units respectively may be generated by the second generating module according to the information; and the configuration information of the dynamic reconfigurable processor may be generated by assembling the array configuration information top and the plurality of processing unit configuration information via the assembly module. The device for generating the configuration information of the dynamic reconfigurable processor according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, both partial configuration and selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

Figure 6:
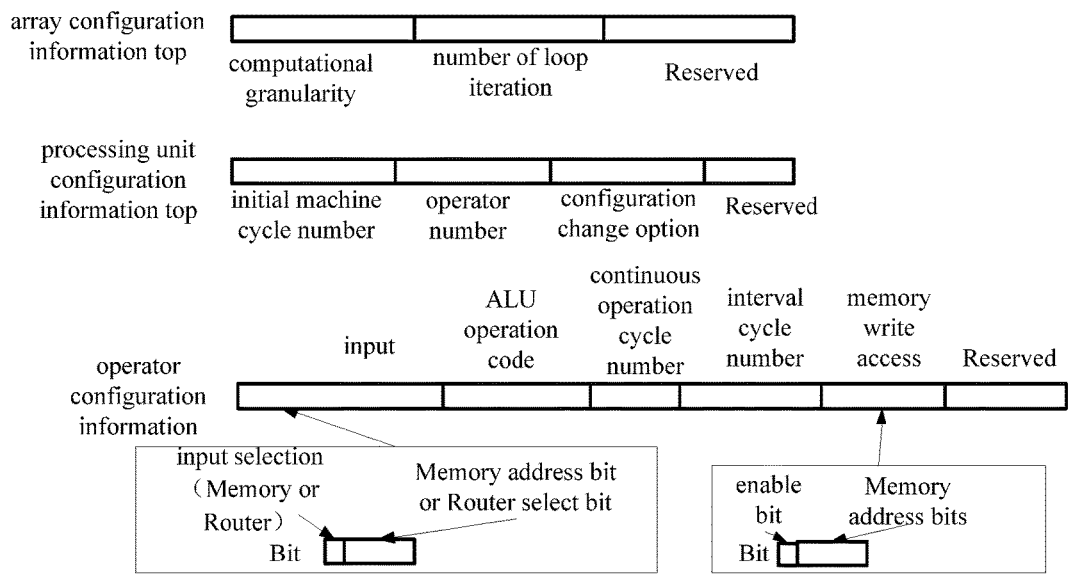
FIG. 6 is a schematic diagram showing contents of configuration information in three-dimensional configuration information according to an embodiment of the present disclosure.

It should be understood that, in one embodiment of the present disclosure, the configuration information of the dynamic reconfigurable processor may be understood as three-dimensional configuration information, which includes the array configuration information top, the processing unit configuration information top and the operator configuration information. As shown in FIG. 6, contents of specific configuration information in three-dimensional configuration information are shown. Based on the characteristics of reconfigurable processor system, the unit of configuration information may be Word (i.e. 32 bits).

Embodiments of the present disclosure embodiment also provide a processor configuration device.

Figure 7:
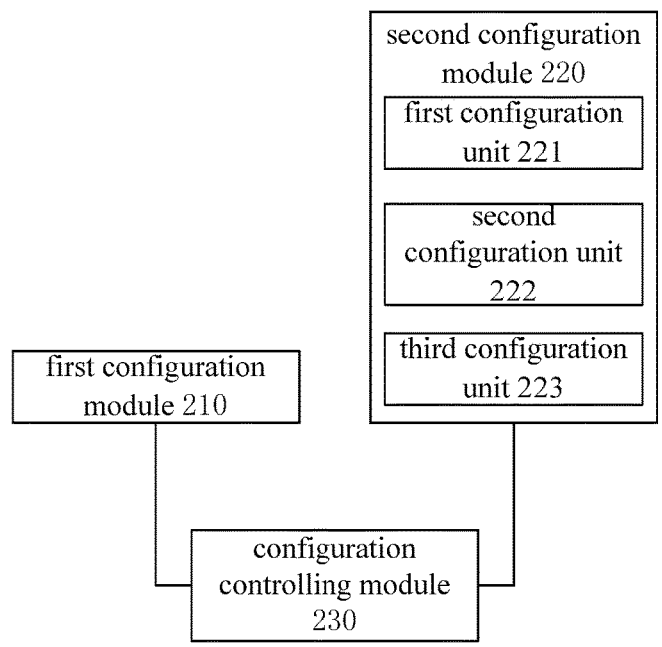
FIG. 7 is a schematic diagram of processor configuration device according to an embodiment of the present disclosure.

FIG. 7 is a schematic diagram of a processor configuration device according to an embodiment of the present disclosure. As shown in FIG. 7, the processor configuration device according to embodiments of the present disclosure includes a first configuration module 210, a second configuration module 220 and a configuration controlling module 230.

Specifically, in some embodiments the first configuration module 210 is configured to read array configuration information top of configuration information, and to distribute a computational granularity and a number of loop iteration of the array configuration information top to a processing unit array. For example, the first configuration module 210 is configured to read the array configuration information top from configuration memory, and to distribute the computational granularity and the number of loop iteration in the array configuration information top to the processing unit array. In some embodiments of the present disclosure, the computational granularity may be written into a computational granularity register in the processing unit array; the number of loop iteration may be written into an iteration number register in the processing unit array.

The second configuration module 220 is configured to read a plurality of processing unit configuration information in the configuration information, and to distribute the plurality of processing unit configuration information to corresponding processing units respectively, in which the processing unit configuration information includes processing unit configuration information top and a plurality of operator configuration information. In some embodiments of the present disclosure, the processing unit configuration information top includes an initial machine cycle number, an operator number and a configuration change option. The initial machine cycle number may be written into an initial machine cycle number register in the processing unit; the operator number may be written into an operator number register in the processing unit; and the configuration change option may be written into a configuration change option register in the processing unit. The plurality of operator configuration information is written one by one into a configuration RAM in the processing unit.

The configuration controlling module 230 is configured to control the first configuration module to read the array configuration information top according to operating parameters, and to control the second configuration module to read the plurality of processing unit configuration information according to the operating parameters. In some embodiments of the present disclosure, the operating parameters can include a count of an initial machine cycle number, a count of a continuous cycle number, a count of an interval cycle number, a count of an operator number and a count of a number of loop iteration.

Figure 8:
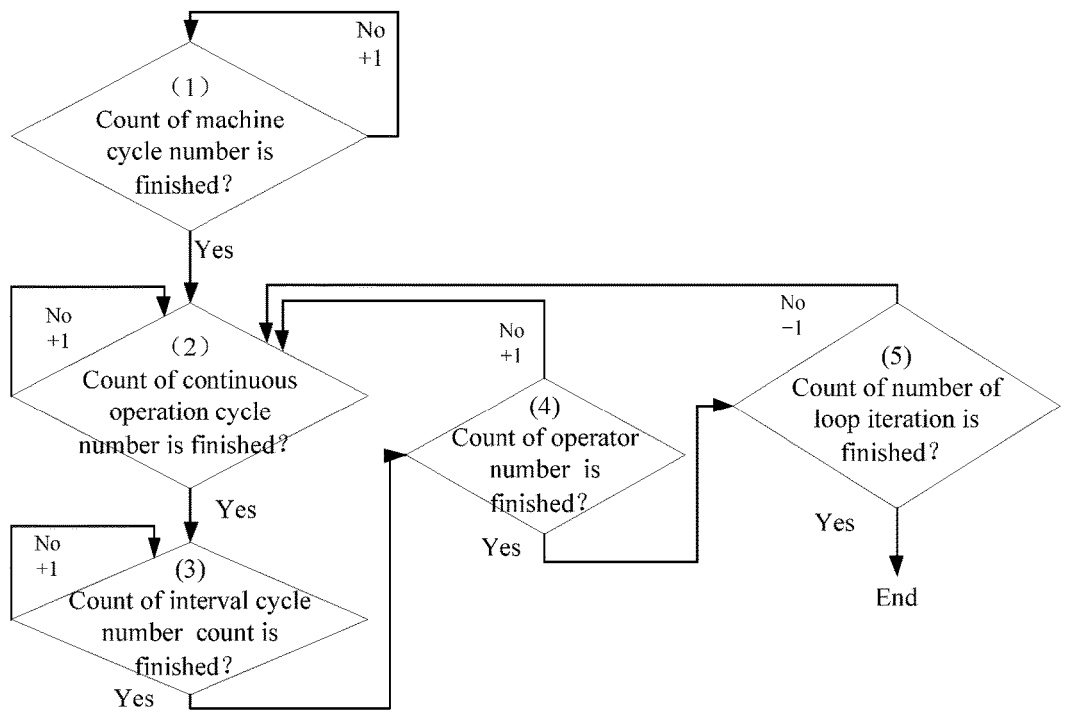
FIG. 8 is a schematic diagram showing relationships between operating parameters of a configuration controlling module according to an embodiment of the present disclosure.

For example, as shown in FIG. 8, the configuration controlling module 230 is configured to count the five operating parameters in the three-dimensional configuration information with the following steps. (1) The whole counting process begins with counting the initial machine cycle number, after the counting of the initial machine cycle number is finished, the processing unit starts to execute the operator configuration information. (2) Corresponding to one execution of the operator configuration information, the first operator configuration information in the configuration memory is read out, and the continuous operation cycle number and the interval cycle number in the first operator configuration information are written to a continuous operation cycle number register and an interval cycle number register respectively, while the rest of the first operator configuration information is written to the processing unit. The continuous operation cycle number is counted, in this process, each machine cycle will enable the processing unit, no new operator configuration information is read out from the configuration memory. (3) The interval cycle number is counted, this process is different from the counting process of the continuous operation cycle number in that: not only no new operator configuration information is read out from the configuration memory, but also processing unit in every machine cycle will not be enabled. Therefore, the processing unit is not working during several machine cycles, until the counts of the parameters are finished. (4) The operator number is counted. With the counted number of operators as the read address of the configuration memory, new operator configuration information is read out. The subsequent configuration process is substantially the same as the configuration control process of the first operator configuration information. When processing unit finished executing all operator configuration information in the three-dimensional configuration information, the count of the operator number is finished. (5) The number of loop iteration is counted. The next configuration process of the iteration of the loop is substantially the same as that in the first iteration. The number of loop iteration is counted, until all the iterations are executed, then the count of the number of loop iteration is finished, which indicates that the operation of the current processing unit is finished.

It should be noted that, in some embodiments of the present disclosure, the configuration controlling module 230 is configured to uses five operation parameters in the three-dimensional configuration information to control read access to the configuration memory. In the top-down order, the five parameters are: the count of the number of loop iteration, the count of the operator number, the count of the initial machine cycle number, the count of the continuous operation cycle number and the count of the interval cycle number. In addition, the configuration controlling module 230 is configured to be enabled by a global synchronization signal sent by the synchronization control unit of the processing unit array. In some embodiments, the synchronization control unit is configured to generate the global synchronization signal which indicates in one machine cycle all processing units in the processing unit array finish executing the operator configuration information, after which the operation of the processing unit array may move to the next machine cycle. In this way, each processing unit in the processing unit array may run in an order according to the order of the mold scheduling results.

Further, in one embodiment of the present disclosure, as shown in FIG. 7, the second configuration module 220 may include a first configuration unit 221, a second configuration unit 222 and a third configuration unit 223. The first configuration unit 221 is configured to read the processing unit configuration information in the plurality of processing unit configuration information, and to distribute the processing unit configuration information top to corresponding processing units respectively, in which the processing unit configuration information top includes an initial machine cycle number. The second configuration unit 222 is configured to read first operator configuration information in the plurality of processing unit configuration information respectively when a count of the initial machine cycle number is finished, and to distribute the first operator configuration information to corresponding processing units respectively. The third configuration unit 223 is configured to read next operator configuration information in the plurality of processing unit configuration information respectively, and to distribute the next operator configuration information to corresponding processing units respectively.

In one embodiment of the present disclosure, the preset condition may be satisfied in the following conditions: the count of the continuous operation cycle number in the operator configuration information is finished, and the count of the interval cycle number count is finished while the count of the operator number is not finished.

Specifically, in some embodiments, the processing unit configuration information top may be read by the first configuration unit 221, and include the initial machine cycle number, the operator number and the configuration change option. The initial machine cycle number is counted. When the count of the initial machine cycle number is finished, the second configuration unit 222 is configured to read the first operator configuration information in the plurality of processing unit configuration information, and to distribute the first operator configuration information to corresponding processing unit. The continuous operation cycle number in the first operator configuration information is counted, after the count of the continuous operation cycle number is finished, the interval cycle number in the first operator configuration information is counted. After the count of the interval cycle number is finished, the operator number in the processing unit configuration information top is counted. If the count of the operator number is not finished yet (i.e. the preset condition is satisfied), the third configuration unit 223 is configured read data on selection bits of the configuration information, and to determine whether the next operator configuration information is an interconnected configuration or an ALU operation code configuration according to the configuration change option in the processing unit configuration information top, and to read the next operator configuration information and distribute to corresponding processing unit according to the determined result. The process of reading the next operator configuration information is substantially the same as that of the first operator configuration information.

It should be noted that, in some embodiments of the present disclosure, if the count of the operator number is finished, i.e. all the operator configuration information has been distributed to the corresponding processing units, then the number of loop iteration in the array configuration information top is counted. If the count of the number of loop iteration is not finished yet, the second configuration unit 222 is configured to re-read the first operator configuration information and to distribute the first operator configuration information to the corresponding processing unit.

With the processor configuration device according to an embodiment of the present disclosure, the array configuration information top of configuration information may be read and the computational granularity as well as the number of loop iteration of the array configuration information top may be distributed to the processing unit array by the first configuration module; the plurality of processing unit configuration information in the configuration information may be read and the plurality of processing unit configuration information may be distributed to corresponding processing units respectively by the second configuration module; and the first configuration module is controlled to read the array configuration information top according to operating parameters, and the second configuration module is controlled to read the plurality of processing unit configuration information according to the operating parameters by the configuration controlling module. The processor configuration device according to an embodiment of the present disclosure has at least the following advantages.

1) Each processing unit has independent configuration information. If function(s) of one or a portion of the processing units changes during the configuration of the reconfigurable processor array, only processing units required to switch configuration are configured and configurations of remaining processing units keep unchanged, without reconfiguring the whole array. In other words, whether the function of the processing unit is changed is determined according to a configuration continuous operation cycle number and a configuration interval cycle number in the configuration information of the processing unit, thus avoiding a repeat configuration of the processing unit. In this way, a partial configuration and a selective configuration may be realized, and the flexibility of configuration may be improved.

2) An amount of configuration information during dynamic switch is reduced, thereby the configuration time is reduced and the requirements on capacity of the configuration memory are reduced.

3) A frequency for accessing the configuration memory is reduced, thus reducing the power consumption.

In the following, the present disclosure will be explained with detailed examples.

Figure 9:
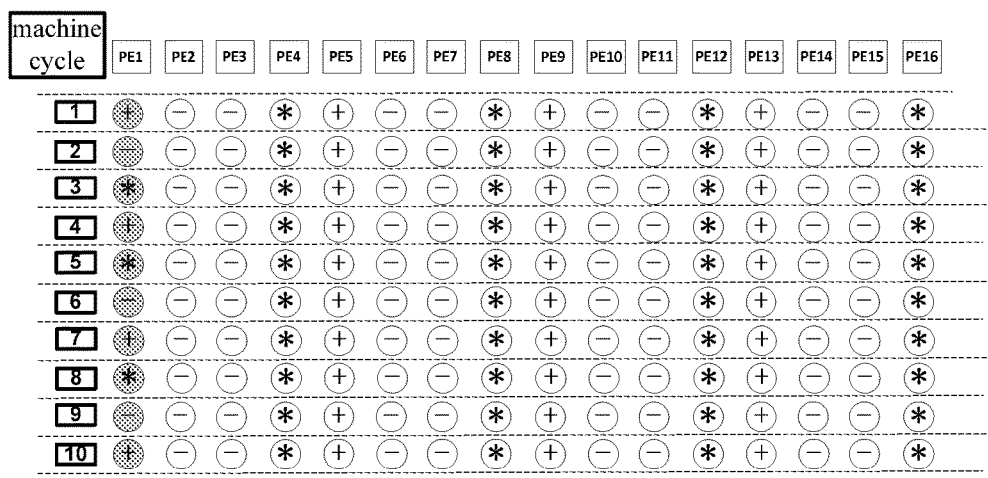
FIG. 9 is a schematic diagram showing functions of a reconfigurable processing unit during each machine cycle according to an embodiment of the present disclosure.

For example, in some embodiments, the parameter can be set as follows. 1) The processing unit array in sub units of the dynamic reconfigurable processor has a size of 4*4, i.e. has 16 processing units. 2) The dynamic reconfigurable processor has one sub unit. 3) The occupying bit number of the array configuration information top is 1 word; the occupying bit number of the processing unit configuration information top is 1 word; and the occupying bit number of each the processing unit configuration information of the processing unit is 2 words. 4) The power for performing dynamic switching 1 word configuration information is 1 nW. 5) Only the first processing unit in the processing unit array changes functions in each cycle of the 10 machine cycles, while functions of the remaining 15 processing units are unchanged in the 10 machine cycle, as shown in FIG. 9. 6) The computational granularity of the ALU in the processing unit is 32 bits; the number of loop iteration is 0.7) The initial machine cycle of the processing unit is the first machine cycle; the operator number is 10.8) The configuration change option is 18 bits; the operator number is 10; the configuration change needs a switching time of 9, in which the former 4 switching is used to change the interconnected configuration information, and the latter 5 switching is used to change the configuration information of the ALU operation code. 9) The input 1, input 2, and input 3 are read accesses from the memory, and the read address in the memory is $[1111100000]_2$; 0 indicates addition of the ALU operation code, 1 indicates subtraction, and 2 indicates multiplication; the continuous operation cycle number is 1 or 10; the interval cycle number is 10; and memory write access address is $[0000011111]_2$.

Figure 10:
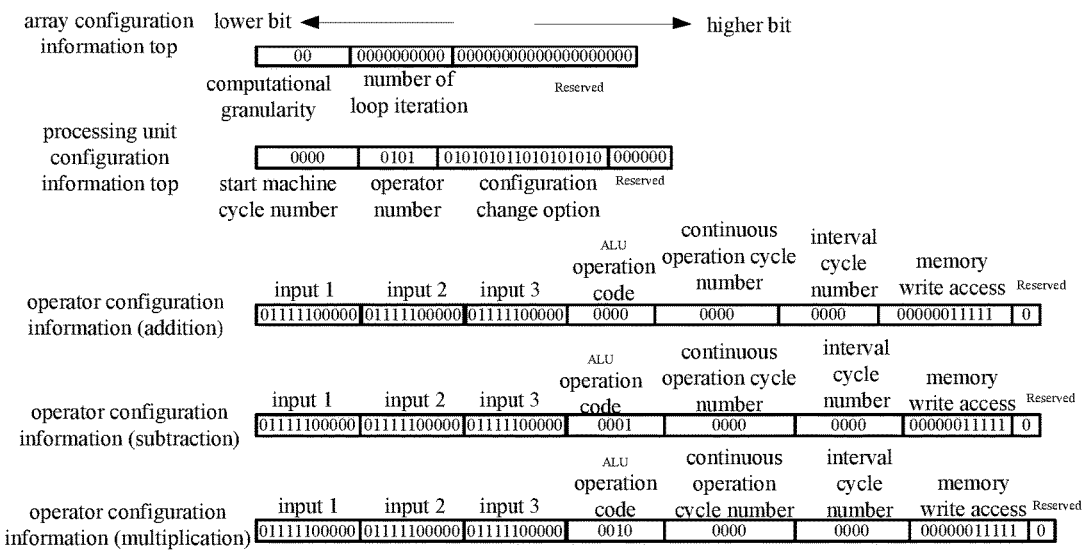
FIG. 10 is a schematic diagram showing contents of configuration information in three-dimensional configuration information according to another embodiment of the present disclosure.

Therefore, according to the parameters, the three-dimensional configuration information structure and the method and device for generating configuration information as set above, PE1 (processing unit 1, by way of example) configuration information may be obtained, as shown in FIG. 10. The array configuration information top includes: (1) a computational granularity having an occupying bit number of 0-1 bit and a bit number of 2, which is corresponding to the computational granularity of the ALU in the processing unit, for example: 2'b00, 32 bits; 2'b01, 16 bits; 2'b10, 8 bits; 2'b11, 4 bits. (2) a number of loop iteration having an occupying bit number of 2-11 bits and a bit number of 10, in which 0 means iteration for 1 times (no cycle is present); 1-1023 means iteration for 2-1024 times. The processing unit configuration information top includes: (1) an initial machine cycle number having an occupying bit number of 0-3 bits and a bit number of 4, in which 0-15 means the calculation is started from the first to the sixteenth machine cycle; (2) an operator number having an occupying bit number of 4-7 bits and a bit number of 4, in which 0-15 means the number of the operator configuration information contained in the operator configuration information section, if 0, it is indicated that the processing unit is not activated; (3) a configuration change option having an occupying bit number of 8-25 bits and a bit number of 18, in which the option of the change of the configuration information may be performed with 2 bits for each operator, 01 means changing the interconnection of the configuration information, 10 means change the ALU operation code of the configuration information, 11 means changing both the interconnection and the ALU operation code of the configuration information, and 00 will not occur. The operator configuration information includes: (1) an input 1 having an occupying bit number of 0-10 bits and a bit number of 11, in which bit 0 is used to indicate the input is from the Router or the memory read access; if the input is from Router, bits 1-5 are effective, which refers to the select signal of 32 inputs to Router; if the input is from the memory, bits 1-10 are effective, which means the read address in the memory; (2) an input 2 having an occupying bit number of 11-21 bits and a bit number of 11, in which bit 0 is used to indicate the input is from the Router or the memory read access; if the input is from Router, bits 1-5 are effective, which means the select signal of 32 inputs to Router; if the input is from the memory, bits 1-10 are effective, which means the read address in memory; (3) an input 3 having an occupying bit number of 22-32 bits and a bit number of 11, in which bit 0 is used to indicate the input is from the Router or the memory read access; if the input is from Router, bits 1-5 are effective, which means the select signal of 32 inputs to router; if it the input is from memory, bits 1-10 are effective, which means the read address in the memory; (4) an ALU operation code having an occupying bit number of 33-37 bits and a bit number of 5, in which 0-31 means 32 kinds of ALU operations; (5) a continuous operation cycle number having an occupying bit number of 38-47 bits and a bit number of 10, in which 1-1024 cycles means the continuous operating machine cycle number of the current operator configuration information; (6) an interval cycle number having an occupying bit number of 48-51 bits and a bit number of 4, in which 0-15 cycles means the unworking machine cycle number between two adjacent operators; (7) a memory write access (output) having an occupying bit number of 52-62 bits and a bit number of 11, in which bits 52 is used to enable the memory write access, bits 53-62 means the memory write address.

In some embodiments, the five operating parameters in three-dimensional configuration information are counted with the following steps in the configuration controller. Firstly, the whole counting process begins with a count of the initial machine cycle number. The initial machine cycle number is 1. Then, configurations of the first operator configuration information in each processing unit are performed with the following steps 1-5. (1) The first operator configuration information in configuration memory is read out, in which the continuous operation cycle number 1 (of PE 1) or 10 (PEs 2-16), and the interval cycle number 0 are written into a continuous operation cycle number register and an interval number register respectively, and the rest of the first operator configuration information is written into the processing unit. (2) The continuous operation cycle number is counted. In this process, each machine cycle will enable the processing unit, no new operator configuration information is read from the configuration memory. Therefore, the same operator configuration information will be executed by the processing unit in successive machine cycles, until the count of the parameters is finished. (3) The interval cycle number is counted. This process is different from the counting process of the continuous operation cycle number in that: not only no new operator configuration information is read from the configuration memory, but also the processing unit will not be enabled in every machine cycle. Therefore, the processing unit will not work during several machine cycles, until the count of the parameters is finished. It should be noted that, when the interval cycle number is 0, the count in this step will be avoided. After the count of the interval cycle number is finished, i.e. one execution of the operator configuration information is finished. (4) The operator number 10 is counted, and the counted operator number is used as the read address of the configuration memory. When new operator configuration information is read out, the subsequent configuration process is the same as the configuration control 1 process of the first operator configuration information. When all the operator configuration information in the three-dimensional configuration information is executed by the processing unit, the count of the operator number is finished. (5) The number of loop iteration is counted. The next iteration configuration process in the iteration of the loop is the same as the configuration process of the first iteration. The number of loop iteration is counted, until all the iterations of the iteration of the loop is executed. Then the count of the number of loop iteration is finished, i.e. the operation of the current processing is finished. With the synchronization to all processing units by the synchronization control unit, that the current processing unit finishes the operation means that all processing units finish the operation, i.e. the entire three-dimensional configuration information is executed by the processing unit array.

With the method and device for generating configuration information of the dynamic reconfigurable processor and the processor configuration device according to embodiments of the present disclosure, the amount of the overall dynamically switched configuration information is reduced, the power consumption is reduced, and the configuration flexibility is improved. According to embodiments of the present disclosure, only the function of PE 1 is changed in different machine cycles, and the functions of PEs 2-16 in different machine cycles are not changed. With this method and device for generating configuration information of the dynamic reconfigurable processor according to embodiments of the present disclosure, dynamically switched configuration information of the processing units 2 to 16 can be compressed.

According to embodiments of the present disclosure, the amount of the dynamically switched configuration information obtained by the method and device according to embodiments of the present disclosure is $1+1+2*10+2*15=52$ words. The amount of dynamically switched configuration information obtained a conventional method and device is $2*16*10=320$ words. In addition, the power consumption of the dynamically switched configuration information obtained by the method and device according to embodiments of the present disclosure is $52*1=52$ nW. The power consumption of the dynamically switched configuration information according to a conventional method and device is $320*1=320$ nW.

With the method and device according to embodiments of the present disclosure, each processing unit in the dynamic reconfigurable array may be configured, only the processing unit required to be configured is configured, without reconfiguring the whole dynamic reconfigurable array. In this way, partial configuration and selective configuration are realized, and the flexibility of configuration is improved.

Embodiments of the present disclosure provide a computer readable storage medium. The computer readable storage medium according to embodiments of the present disclosure includes a computer program for executing the method for generating configuration information of the dynamic reconfigurable processor described above when running on a computer.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It may be understood by those having the ordinary skills in the related art that all or part of the steps in the method of the above embodiments may be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module may be embodied in hardware, or software. If the integrated module is embodied in software and sold or used as an independent product, it may be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for generating configuration information of a dynamic reconfigurable processor, the dynamic reconfigurable processor comprising a processing unit array, and the processing unit array including a plurality of processing units, wherein the method comprises steps of:
   reading information of a task to be executed and generating an array configuration information top of the processing unit array according to the information;
   generating a plurality of processing unit configuration information corresponding to the plurality of processing units respectively according to the information; and
   assembling the array configuration information top and the plurality of processing unit configuration information;
   wherein generating the array configuration information top of the processing unit array according to the information comprises:
   extracting a computational granularity and a number of loop iteration of the task to be executed from the information, and the array configuration information top comprises the computational granularity and the number of loop iteration;
   wherein the processing unit configuration information includes processing unit configuration information top and a plurality of operator configuration information, the processing unit configuration information top includes an initial machine cycle number, an operator number and a configuration change option, and the operator configuration information includes an input, an ALU operation code, a continuous operation cycle number, an interval cycle number and a memory write access.

2. The method according to claim 1, wherein generating a plurality of processing unit configuration information corresponding to the plurality of processing units respectively according to the information comprises:
   determining an execution instruction mapped into one of the plurality of processing units according to the information, and generating the processing unit configuration information corresponding to the one processing unit according to the execution instruction.

3. The method according to claim 1, wherein a number of the operator configuration information is substantially the same as the operator number, and each operator has corresponding operator configuration information.

4. The method according to claim 1, wherein assembling the array configuration information top and the plurality of processing unit configuration information comprises:
assembling the array configuration information top and the plurality of processing unit configuration information in a preset order.

5. A device for generating configuration information of a dynamic reconfigurable processor, the dynamic reconfigurable processor comprising a processing unit array, and the processing unit array including a plurality of processing units, wherein the device comprises:
a storage module of a task to be executed, configured to store information of the task to be executed;
a reading module, configured to read the information;
a first generating module, configured to generate array configuration information top of the processing unit array according to the information;
a second generating module, configured to generate a plurality of processing unit configuration information corresponding to the plurality of processing units respectively according to the information; and
an assembly module, configured to assemble the array configuration information top and the plurality of processing unit configuration information to generate the configuration information of the dynamic reconfigurable processor,
wherein the first generating module is configured to extract a computational granularity and a number of loop iteration of the task to be executed from the information, and the array configuration information top comprises the computational granularity and the number of loop iteration,
wherein the processing unit configuration information includes the processing unit configuration information top and a plurality of operator configuration information, the processing unit configuration information top includes an initial machine cycle number, an operator number and a configuration change option, and the operator configuration information includes an input, an ALU operation code, a continuous operation cycle number, an interval cycle number and a memory write access.

6. The device according to claim 5, wherein the second generating module is configured to determine an execution instruction mapped into one of the plurality of processing units according to the information, and to generate the processing unit configuration information corresponding to the one processing unit according to the execution instruction.

7. The device according to claim 5, wherein a number of the operator configuration information is substantially the same as the operator number, and each operator has corresponding operator configuration information.

8. The device according to claim 5, further comprising:
a configuration storage module, configured to store the configuration information generated by the assembly module.

9. A processor configuration device, comprising:
a first configuration module, configured to read array configuration information top of configuration information, the read array configuration information top comprising a computational granularity and a number of loop iteration extracted from information of the task to be executed and to distribute the computational granularity and the number of loop iteration of the array configuration information top to a processing unit array;
a second configuration module, configured to read a plurality of processing unit configuration information in the configuration information, and to distribute the plurality of processing unit configuration information to corresponding processing units respectively, wherein the processing unit configuration information includes processing unit configuration information top and a plurality of operator configuration information, the processing unit configuration information top includes an initial machine cycle number, an operator number and a configuration change option, and the operator configuration information includes an input, an ALU operation code, a continuous operation cycle number, an interval cycle number and a memory write access; and
a configuration controlling module, configured to control the first configuration module to read the array configuration information top according to operating parameters, and to control the second configuration module to read the plurality of processing unit configuration information according to the operating parameters.

10. The device according to claim 9, wherein the operating parameters include a count of an initial machine cycle number, a count of a continuous cycle number, a count of an interval cycle number, a count of an operator number and a count of a number of loop iteration.

11. The device according to claim 9, wherein the second configuration module comprises:
a first configuration unit, configured to read the processing unit configuration information in the plurality of processing unit configuration information, and to distribute the processing unit configuration information top to corresponding processing units respectively, wherein the processing unit configuration information top includes an initial machine cycle number;
a second configuration unit, configured to read first operator configuration information in the plurality of processing unit configuration information respectively when a count of the initial machine cycle number is finished, and to distribute the first operator configuration information to corresponding processing units respectively;
a third configuration unit, configured to read next operator configuration information in the plurality of processing unit configuration information respectively, and to distribute the next operator configuration information to corresponding processing units respectively.

* * * * *